(12) United States Patent
Lasensky et al.

(10) Patent No.: US 8,949,289 B2
(45) Date of Patent: Feb. 3, 2015

(54) SYSTEM AND METHOD FOR MULTILINGUAL TRANSCRIPTION SERVICE WITH AUTOMATED NOTIFICATION SERVICES

(75) Inventors: Peter Lasensky, San Diego, CA (US); Ang Dawa Sherpa, Oceanside, CA (US); Fred McClain, Cardiff, CA (US); Stephen Mickelsen, Encinitas, CA (US); Jonathan Schwartz, Vista, CA (US)

(73) Assignee: NoteVault, Inc., San Diego, CA (US)

( * ) Notice: Subject to any disclaimer, the term of this patent is extended or adjusted under 35 U.S.C. 154(b) by 186 days.

(21) Appl. No.: 12/774,662

(22) Filed: May 5, 2010

(65) Prior Publication Data

US 2010/0287215 A1 Nov. 11, 2010

Related U.S. Application Data

(60) Provisional application No. 61/175,753, filed on May 5, 2009.

(51) Int. Cl.
*G06F 7/00* (2006.01)
*G06F 17/30* (2006.01)
*G06Q 10/06* (2012.01)

(52) U.S. Cl.
CPC ...................................... *G06Q 10/06* (2013.01)
USPC ........................................................ 707/805

(58) Field of Classification Search
None
See application file for complete search history.

(56) References Cited

U.S. PATENT DOCUMENTS

| 6,175,822 | B1 | 1/2001 | Jones |
| 7,672,841 | B2 * | 3/2010 | Bennett .......................... 704/215 |
| 2003/0083966 | A1 * | 5/2003 | Treibach-Heck et al. ...... 705/32 |
| 2004/0205343 | A1 * | 10/2004 | Forth et al. .................... 713/168 |
| 2005/0009507 | A1 * | 1/2005 | Gilbert ....................... 455/412.1 |
| 2006/0085238 | A1 * | 4/2006 | Oden et al. ......................... 705/7 |
| 2006/0277205 | A1 * | 12/2006 | Song et al. .................... 707/102 |
| 2007/0094661 | A1 * | 4/2007 | Baird et al. ................... 718/102 |
| 2009/0083257 | A1 * | 3/2009 | Bargeron et al. ................. 707/5 |
| 2010/0094618 | A1 * | 4/2010 | Zimmerman et al. ............ 704/9 |
| 2010/0291528 | A1 * | 11/2010 | Huerta .......................... 434/362 |
| 2012/0078899 | A1 * | 3/2012 | Fontana et al. ............... 707/736 |

FOREIGN PATENT DOCUMENTS

| WO | WO-00-49601 A1 | 8/2000 |
| WO | WO-01/67293 A1 | 9/2001 |
| WO | WO-2009/035842 A1 | 3/2009 |

OTHER PUBLICATIONS

International Search Report and Written Opinion dated Dec. 16, 2010 for PCT Application No. PCT/US2010/033785.

* cited by examiner

*Primary Examiner* — Rehana Perveen
*Assistant Examiner* — Raheem Hoffler
(74) *Attorney, Agent, or Firm* — Pillsbury Winthrop Shaw Pittman LLP

(57) ABSTRACT

A system and method for generating and managing a secure, multi-user project database.

21 Claims, 4 Drawing Sheets

SYSTEM AND METHOD FOR MULTILINGUAL TRANSCRIPTION SERVICE WITH AUTOMATED NOTIFICATION SERVICES

This Application claims priority to U.S. Provisional Patent Application Ser. No. 61/175,753, filed May 5, 2009, which is incorporated by reference in its entirety.

TECHNICAL FIELD

Embodiments of the present invention are directed to systems and methods for project management in general and, in particular, to systems and methods for online information processing of mobility generated data.

BACKGROUND

Construction workers are notorious for failing to maintain adequate documentation of events on their construction jobs. In the event of a dispute, failure to have supporting documentation can be expensive and in some cases devastating for a construction firm. Construction supervisors can be mobile 90% of the time and consequently have difficulty finding time to sit at a computer and enter data, while conventional handheld mobile technology is slow, burdensome and expensive.

SUMMARY

In one aspect of the invention, a method for generating and managing a secure, multi-user information database includes receiving and recording information related to a project from an originator's client device, wherein the information comprises one or more of a voice-note and a data attachment, providing a confirmation code to the originator, configured to provide a record locator for the information, transcribing the information to a transcription comprising language normalization and information parsing to predetermined information categories, reviewing the transcription at a second level of language normalization and information parsing to predetermined information categories, wherein the transcription is accepted or corrected, submitting the transcription to the originator, wherein the transcription is either accepted or corrected, and either approved for inclusion in project reports or disapproved, and posting the transcription and data attachments as project notes to a common access site wherein the project notes are available for review by users with predefined access rights.

In another aspect, the method may include polling originators and transcribers for compatibility metrics and analyzing the compatibility metrics to align originators with transcribers for future transcriptions.

In another aspect, the common access site includes a project calendar, specific to an originator or a project, indicating days when notes were posted to the project and days when notes were not posted to the project, and the method may include providing notification to an originator who did not post required information to the project, escalating the notification to a project manager when the originator is unresponsive to the notification, and providing management with an informational view of the calendar wherein the management can determine the originator's reporting compliance.

In another aspect, the user's client device is location aware and the method may include receiving location information from the client device and correlating keywords or tags in the project notes with the location information to generate a location based event and issue histogram for the project.

In another aspect, the method may also include generating a project completion punch-list of uncompleted items assigned to a user identified as a project resource, wherein items in the punch-list are derived from a master list comprising a list of all items associated with project resources in a required order of completion, wherein after a punch-list item is completed by the user and reported to the information database, a next uncompleted item in the required order of completion is assigned to the project resource associated with the next uncompleted item in the master list. An updated punch-list of uncompleted items may be automatically generated and distributed to resource daily. An updated punch-list of uncompleted items may be automatically generated and distributed to resource on demand.

In another aspect, the predefined access rights include administration, full access, partial access, guest access and no access.

In another aspect, the method may also include printing a form such as a time sheet preconfigured with information identifying an employee and the projects the employee is assigned to, receiving an image of the of the time sheet that includes hours and work codes entered by the employee, processing the image with optical character recognition (OCR) software to extract payroll data including the identifying information, the hours and the work codes, and posting the payroll data to a payroll system for review.

Other aspects of the invention include a system and a computer program product configured to perform the method.

BRIEF DESCRIPTION OF THE DRAWINGS

Embodiments of the present invention are illustrated by way of example, and not of limitation, in the figures of the accompanying drawings in which.

DETAILED DESCRIPTION

Figure 1:
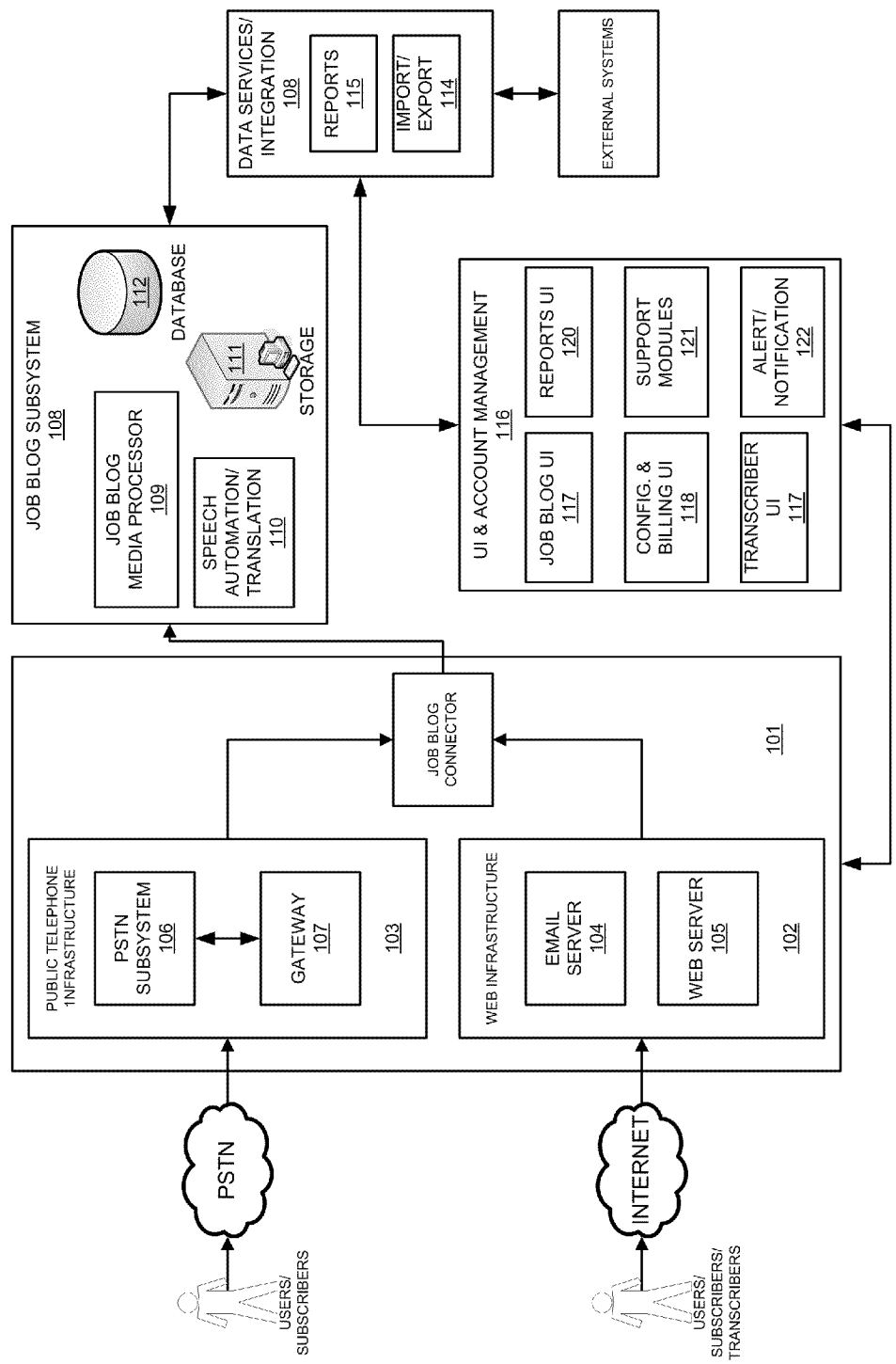
FIG. 1 is a functional block diagram illustrating a system according to one embodiment.

In the following description, numerous specific details are set forth such as examples of specific components, devices, methods, etc., in order to provide a thorough understanding of embodiments of the present invention. It will be apparent to one skilled in the art, however, that these specific details need not be employed to practice embodiments of the present invention. In other instances, well-known materials or methods have not been described in detail in order to avoid unnecessarily obscuring embodiments of the present invention. The term "coupled" as used herein, may mean directly coupled or indirectly coupled through one or more intervening components.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Embodiments of the present invention provide a secure web-based blog service designed for users such as construction supervisors to enable them to document events while on-site at construction jobs using their cellular phone and/or wireless enabled mobile phone or PDA. Mobile users such as construction supervisors can log voice notes, photos, videos, and emails—with or without attachments—into the web-based application whereby all data posted is time stamped by a third party, thus providing an independent record of an event. Voice notes may be transcribed by voice recognition software or human transcribers. A two tier transcription process ensures accuracy in multiple languages. Built in subscriber review mechanisms ensure the accurate content of all voice notes.

Thanks to the proliferation of 3G and wireless-enabled mobile phones, mobile phones with cameras, and sophisticated PDA's, potential users likely already have all the hardware on their belt they need to use the service. Research shows that users are likely to perform more documentation with substantially better detail using voice dictated from their mobile phone than using traditional text entry, which otherwise would typically be done at a later time using a computer located at an office. The resultant benefits include: mitigated risk—due to higher quality documentation that can be used to re-create events, and lower costs due to the eased burden of creating and obtaining adequate job documentation.

Subscriptions are required to enable input and access to the service for daily activity reports (DAR). In one embodiment, the service can post DAR data directly behind a customer's firewall into a third-party project management system such as Prolog, CMiC, Lotus Notes or Microsoft Exchange Server and SharePoint.

Table I, below, defines terms that may be used in the following description.

TABLE I

| TERM | DEFINITION |
|---|---|
| Billing Account | An account with a single billing relationship with a company. A Billing Account tracks and bills for usage. A company may have more than one Billing Account |
| Actor | An Actor represents a person known to the service. |
| System Administrator | An Actor with full system privileges. For example this is the only Actor that can create new Billing Accounts. |
| Billing Contact | A single representative who handles the business relationship and can make changes to the billing information and as well as any changes that impacts the cost. Billing Contacts can add Account Managers Billing Contacts do not need to be a User. |
| Subscriber (or User) | A customer assigned to an account. Subscribers may or may not have access to any projects. |
| Member | A Subscriber that has deposit rights to a project |
| Guest | A Subscriber that has read-only rights to a project |
| Transcriber | Actors who transcribe the subscriber's voice notes. Transcribers are not associated with a particular Billing Account. |
| Project | Projects are created by the Subscriber and are used to group a series of Notes together. |
| Notes | Notes contain the content added by Subscribers. |
| Subscriber Phone # | A phone number associated with a Subscriber for the purpose of adding Notes (typically their mobile phone number). |
| Active Project | A project that is currently accepting content and is being billed for. |
| In-active Project | A project that is archived for viewing but is not accept new content and is being billed for at a reduced price. |
| Project Phone # | A phone number assigned to the Project. Each Project is assigned one phone where subscribers can deposit voice notes. |
| Project URL | A URL assigned to the Project. Each Project is assigned one URL where subscriber can deposit notes via SMS, MMS, or the like. |
| Project Note EMAIL | Standard email address assigned to the Project. Each project is assigned and email address for receiving embedded text and/or any attachment. |
| Project PTT # | A Nextmail number assigned to Project. Upon customer approval, Subscriber can deposit voice notes to this PTT number. Transcription may be available for Nextmail voice files. |
| Project IM | An Instant Message address assigned to each project |
| ASR | "Automated Speech Recognition". ASR is used to transcribe Subscribers voice notes to text without a person's help. |
| DAR | Daily Activity Report |

FIG. 1 is a functional block diagram illustrating a system 100 according to one embodiment of the invention. It will be appreciated that the functional blocks of system 100 may be implemented in hardware, software or a combination of hardware and software as is known in the art. The system 100 includes a receiving system 101 configured to receive project information from an originator over the Internet via a web-based infrastructure 102 and over the public switched telephone network (PSTN) via a public telephone network infrastructure 103. The web-based infrastructure 102 may include an email server 104 and a web server 105 to provide connectivity with a job blog subsystem 108 described below. Email servers and web servers are known in the art and are not described here in detail. The telephone network infrastructure 103 may include a PSTN compatible subsystem 106 coupled with a gateway 107 to provide connectivity to the job blog subsystem 108.

Job blog subsystem 108 may include a job blog media processor 109 configured to process multimedia content such as text messages, images, audio and video data files. Job blog subsystem 108 may also include a speech automation and translation module 110, described in greater detail below, configured to provide machine-based translation and transcription of voice notes received from receiving system 101. Job blog subsystem 108 may also include a data storage device 111 (e.g., a computer with a mass storage device) configured to maintain a database 112 of projects, project notes, project data, subscriber information and user information.

System 100 may also include a data services and integration subsystem 113, coupled with the job blog subsystem, comprising a data import/export module 114 and a report generation module 115. Import/export module 114 may be configured to provide an interface with third party systems and software such as conventional project management systems and software, accounting systems and software and the like. Report generation module 115 may be configured to process and format data maintained by the job blog subsystem 108 for presentation to user and subscribers of the service.

System 100 also includes a user interface and account management (UI/AM) subsystem 116 coupled with the data services and integration subsystem 113 and the receiving system 101. The user interface and account management subsystem 116 provides interfaces through the web-based infrastructure 102 for various users and functions of the system 100. For example, the UI/AM subsystem may include a job blog user interface 117 to provide a web interface for job blog entries, a configuration and billing interface user interface 118 to provide account setup, configuration and monitoring to authorized users, and a transcriber user interface 119 to provide access to human transcribers as described in greater detail below. UI/AM subsystem 116 may also include a report user interface 120 configured to format and present reports generated by report generation module 115, one or more support modules 120 to provide data analysis services described below, and an alert and notification module 122 to provide notice and notice escalation services as described below.

In one embodiment, the receiving system 101 may be configured to receive project information from a user (the originator) who originates the information. The originator may access the system 100 by way of a cellphone, smartphone, PDA or other wireless-enabled device. The information may include live or recorded voice reports, text messages, photograph of job sites and the like. The project information may be recorded in job blog subsystem 108, which may be configured to provide a confirmation code to the originator, which can later be used by the originator to demonstrate that the information was provided to the system.

Figure 2:
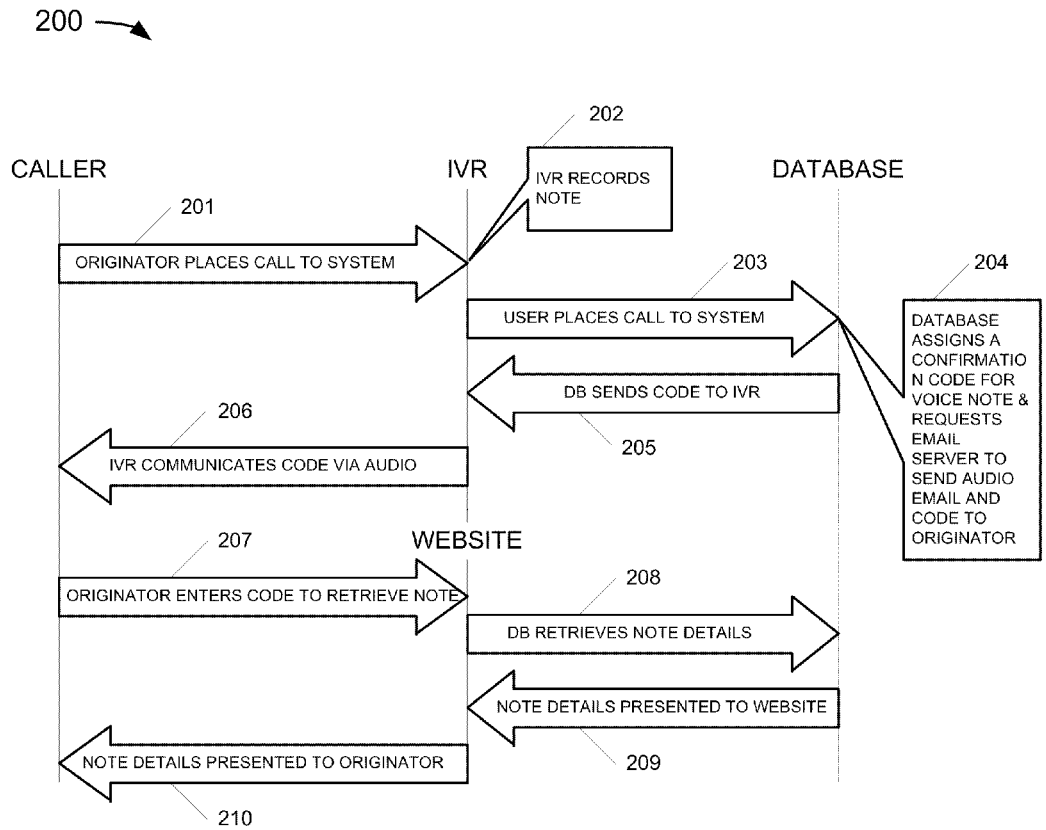
FIG. 2 is a flowchart illustrating the generation of a confirmation code in one embodiment.

FIG. 2 illustrates a process 200 by which such a confirmation code can be generated and used. In operation 201, the originator places a call to the system, enters authentication information (e.g., a user name and password) and dictates a voice note. At operation 202, an interactive voice recorder (IVR) records the voice note. In operation 203, the IVR authenticates the originator's credentials and the database 112 assigns a confirmation code to the originator's voice note and triggers the email server to send a confirming email to the originator. The database 112 also sends the confirmation code to the IVR in operation 205 and the IVR communicates an audio confirmation to the originator in operation 206. At any later time, as in operation 207, the originator can access the web server 105 to enter the confirmation code. In operation 208, the web server accesses the database 112 to retrieve the voice note and details regarding the voice note (e.g., time and date of the voice note). In operation 209, the note and note details are presented to the web server and in operation 210, the note and note details are presented to the originator. In one embodiment, an authorized user other than the originator may have access to the voice note.

In one embodiment, when the language of the originator is not a target language (e.g., English), the speech automation and translation module 110 is configured to provide a translated transcription of the project information (e.g., voice note) in the target language and to parse the project information into predetermined categories based on the detection of keywords and key phrases. Examples of predetermined categories may include lessons learned, safety issues, change orders, logistics issues, insurance issues, labor issues and regulatory issues (e.g., OSHA violations).

In one embodiment, the system 100 may be configured to provide a machine translation/transcription to a human transcriber via the transcriber user interface 119, where the transcription may be reviewed and corrected or accepted by the human transcriber in a second level of transcription.

In one embodiment, the second level of transcription may be provided to the originator via the job blog user interface 117, where the second level of transcription is either accepted or corrected, and either approved or disapproved for inclusion in project reports.

In one embodiment, after the transcription is approved, the report generation module 115 is configured to post the transcription to a common access web site as a project note that may be reviewed by users with predefined access rights.

In one embodiment, users with predefined access rights may include project managers, project supervisors, inspectors, engineers, project owners and predefined access rights may include administration rights, full access rights, partial access rights, guest access rights and no access rights. Access rights associated with each user category and level of access may include or exclude rights to record project notes, view project notes, edit project notes and print project notes. The system may also be configured to provide roll-based reports and analytics using its reports module 115, reports user interface 120 and support modules 121. For example, a user who is identified in the system as a safety inspector may receive a customized report on daily safety issues while a user identified in the as the project superintendent may receive a more generic daily construction report.

In one embodiment, the UI/AM module may be configured to poll originators and human transcribers for subjective and objective compatibility metrics and to align originators with transcribers for future transcriptions based on an analysis of the compatibility metrics.

It will be appreciated that originators may fail to provide project notes on every day in which project activity occurs, and which project notes may be required by the project manager. Accordingly, in one embodiment, the alert and notification module 122 is configured to provide notification to an originator who does not post required information to the project and to escalate the notification to a project manager when the originator is unresponsive to the notification.

In one embodiment, an originator's project information may include location data (e.g., the originator's cellphone, Smartphone or PDA may include GPS capability or cell-site triangulation capability for geolocation) and the report generation module 115 may be configured to correlate keywords or tags in the project information (such as keywords associated with the categories described above) with the location data to generate a location based event and issue histogram for the project.

A critical aspect of project management, and especially of construction project management, is the need to close the project without defects or omissions. At the end of a project, a project manager walks the jobsite and compiles a job completion "punch-list" that identifies omissions and defects (otherwise known as items or issues). Then, either contemporaneously or subsequently, compiles a list of tasks associated with each item and the project resource that is required to complete each task and the order of the tasks. For example, assume the project manager may discovers a hole in a wall. The hole gets listed as an item on the punch list. The tasks associated with fixing the defect may include patching the hole, mudding the drywall and painting the wall, in that order, and the required resources may include a drywaller, a plasterer and a painter respectively.

When the project manager completes his walkthrough, he may have a long list of items with associated tasks and resources that can be entered into the system as linked tasks (predecessor-successor) with resource assignments. These task-resource assignments may be reported out by the system and updated as the tasks are completed, either on a daily bases or in real time as predecessor tasks are completed by a resource, making possible the start of a successor task. Continuing the hole in the wall example above, the system could send a work order to the drywaller (e.g., via his wireless-enabled device) to patch the hole. When the drywaller completes the task, he reports it to the system, which then sends a work order to the plasterer. The cycle repeats, and when the drywaller reports the completion of his task, the system sends a work order to the painter, and so on through the project managers entire punch list until all defects and omissions are addressed. The system may also be configured to handle exceptions. For example, assume the drywaller discovers that the hole in the wall is too big to patch without some kind of backing that requires the skills of a carpenter. The drywaller can report this exception to the system, which can then modify the punch-list by adding and linking the carpenter task.

Accordingly, in one embodiment of the invention, the web-based user interface module 117 is configured to provide a project completion punch-list of uncompleted items with associated tasks assigned to users identified as project resources, where items in the punch-list are derived from a master list comprising a list of items and associated tasks and corresponding project resources in a required order of completion, where after a punch-list item is completed by the project resource and reported to the information database, the next task in the required order of completion is assigned to the project resource associated with that task.

Figure 3:
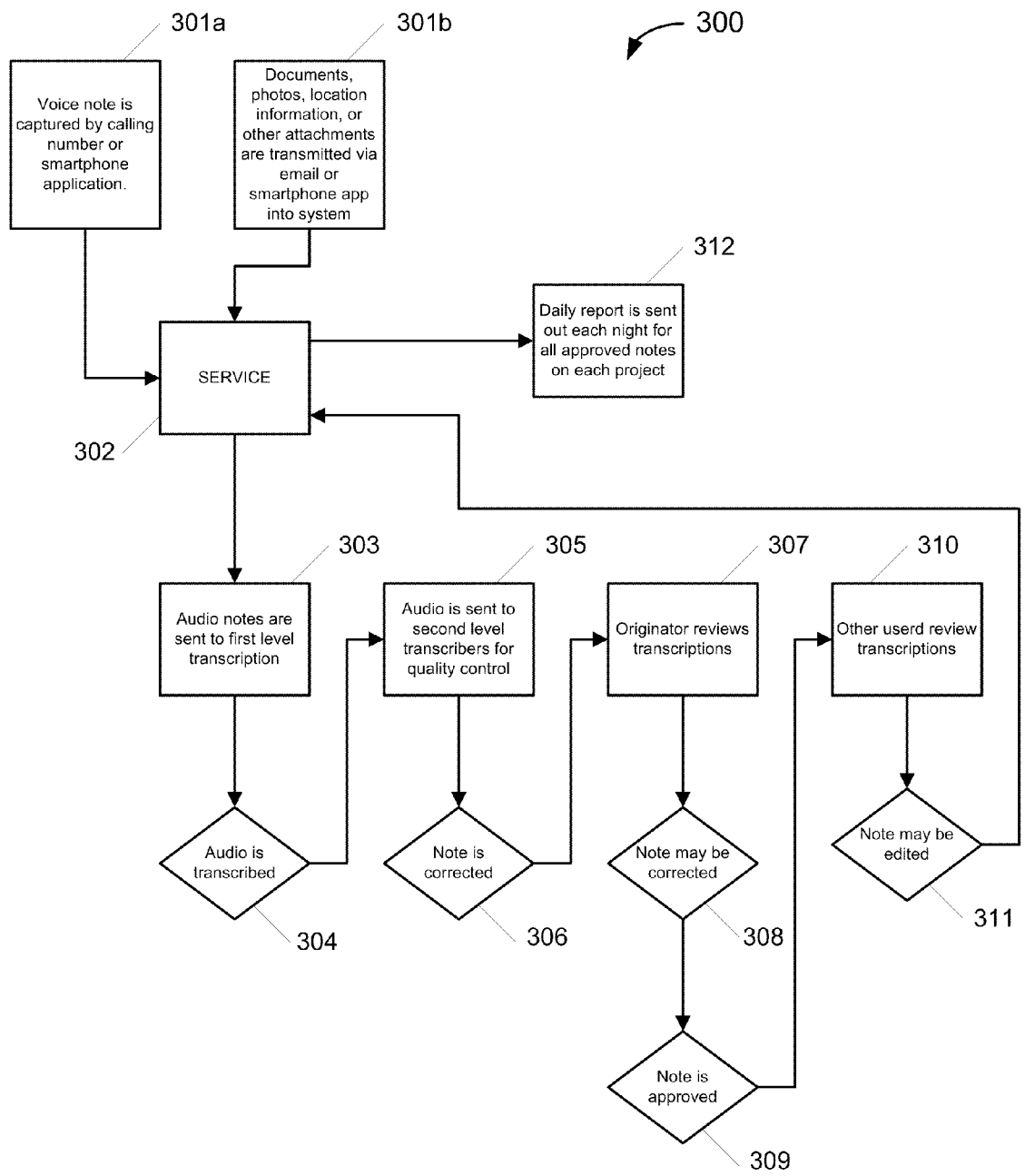
FIG. 3 is a flowchart illustrating the lifecycle of a project note in one embodiment.

FIG. 3 is a flowchart 300 illustrating the lifecycle of a project note according to one embodiment of the invention. In operation 301a, a voice note is captured when an originator accesses the system 100 service at operation 302 via a calling number or a smartphone application configured to access the system 100. In operation 301b, the originator adds documents, photos, location information or other data attachments to the project information via email or a project specific web application. In operation 303, the audio notes are sent to a first level of transcription where, in operation 304 the audio is transcribed. In operation 305, the audio is sent to a second level of transcription for quality control. In operation 306, the note is corrected. In operation 307, the originator reviews the transcription. In operation, the project note is subject to correction by authorized users. In operation 309, the project note is approved. In operation 310, other users are authorized to review the transcription. In operation 311, the project note is subject to editing by authorized users, where the edited note is stored in the system 100 at operation 302. Finally, at operation 312, the system generates a daily report with approved project notes.

Figure 4:
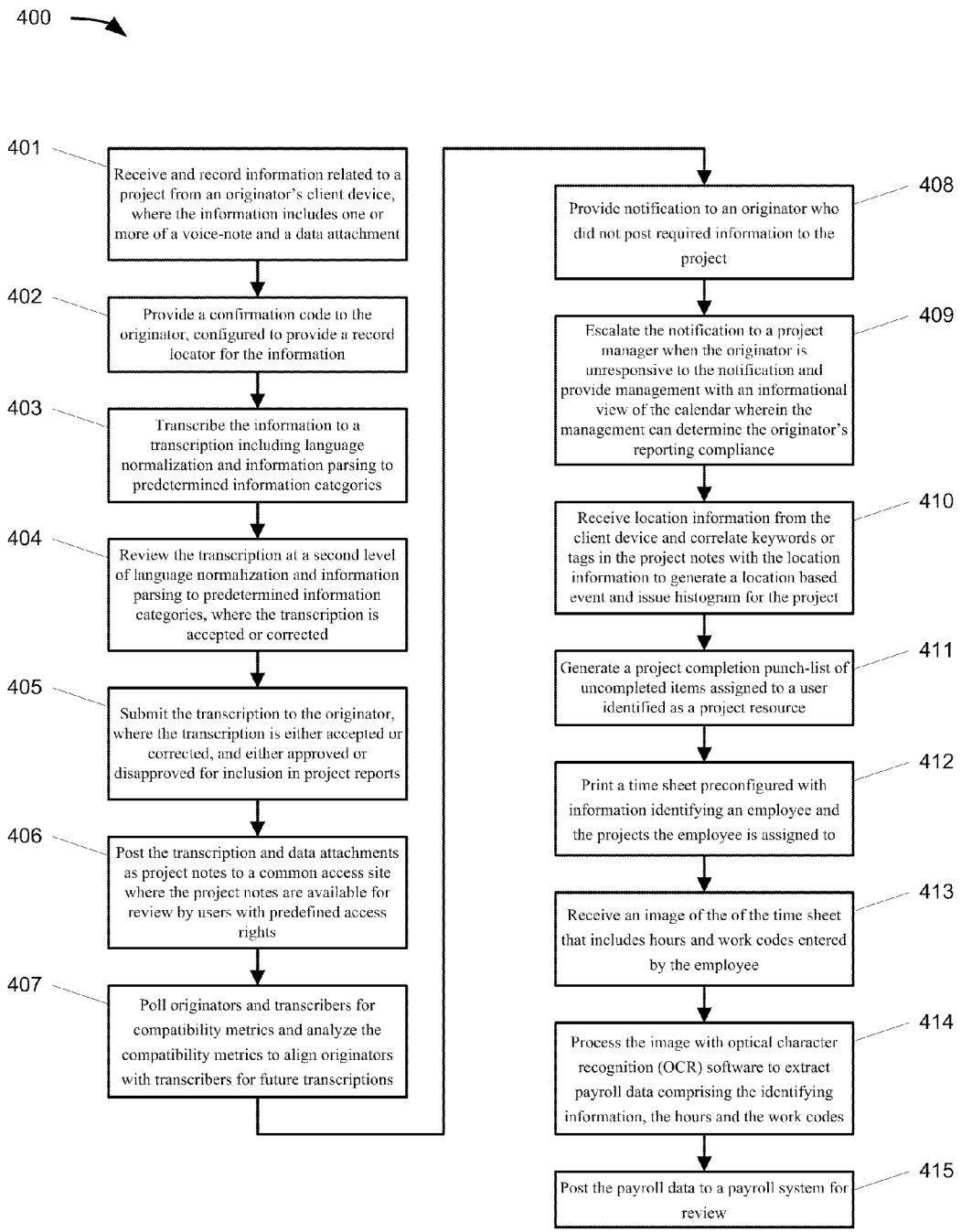
FIG. 4 is a flowchart illustrating a method according to one embodiment.

FIG. 4 is a flowchart 400 illustrating a method according to one embodiment of the present invention. Operation 401 includes receiving and recording information related to a project from an originator's client device, where the information includes one or more of a voice-note and a data attachment. Operation 402 includes providing a confirmation code to the originator, configured to provide a record locator for the information. Operation 403 includes transcribing the information to a transcription including language normalization and information parsing to predetermined information categories. Operation 404 includes reviewing the transcription at a second level of language normalization and information parsing to predetermined information categories, where the transcription is accepted or corrected. Operation 405 includes submitting the transcription to the originator, where the transcription is either accepted or corrected, and either approved for inclusion in project reports or disapproved. Operation 406 includes posting the transcription and data attachments as project notes to a common access site where the project notes are available for review by users with predefined access rights. Operation 407 includes polling originators and transcribers for compatibility metrics and analyzing the compatibility metrics to align originators with transcribers for future transcriptions. Where the common access site includes a project calendar, specific to an originator or a project, indicating days when notes were posted to the project and days when notes were not posted to the project, operation 408 includes providing notification to an originator who did not post required information to the project. Operation 409 includes escalating the notification to a project manager when the originator is unresponsive to the notification, providing management with an informational view of the calendar wherein the management can determine the originator's reporting compliance and providing management reports with analysis of user compliance. Wherein the user's client device is location aware, operation 410 includes receiving location information from the client device and correlating keywords or tags in the project notes with the location information to generate a location based event and issue histogram for the project. Operation 411 includes generating a project completion punch-list of uncompleted items and associated tasks assigned to a user identified as a project resource, where items in the punch-list are derived from a master list comprising a list of all items and tasks associated with project resources in a required order of completion, where after a successor task is completed by the user and reported to the information database, a successor task is assigned to the project resource associated with the successor task. Operation 412 includes printing a time sheet preconfigured with information identifying an employee and the projects the employee is assigned to. Operation 413 includes receiving an image of the of the time sheet that includes hours and work codes entered by the employee. Operation 414 includes processing the image with optical character recognition (OCR) software to extract payroll data comprising the identifying information, the hours and the work codes. And operation 415 includes posting the payroll data to a payroll system for review.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method for generating and managing a secure, multi-user information database, comprising:
   receiving and recording, utilizing a voice recorder, information related to a project from an originator's client device, wherein the information comprises a voice-note and a data attachment,
   providing an audio confirmation to the originator, comprising a confirmation code configured to provide a record locator for the information;
   transcribing the information to a transcription, the step of transcribing comprising language normalization;
   parsing the transcription to be posted to extract a key phrase therefrom, and associating the entire transcription to a single one of predetermined information categories, selected based at least in part on the extracted key phrase;
   reviewing the transcription at a second level of language normalization and information parsing to predetermined information categories, wherein the transcription is accepted or corrected,
   submitting the transcription to the originator, wherein the transcription is either accepted or corrected, and either approved for inclusion in project reports or disapproved;
   posting the transcription and data attachments as project notes to a common access site wherein the project notes are available for review by users with predefined access rights.

2. The method of claim 1, further comprising:
   polling originators and transcribers for compatibility metrics; and
   analyzing the compatibility metrics to align originators with transcribers for future transcriptions.

3. The method of claim 1, wherein the common access site includes a project calendar, specific to an originator or a project, indicating days when notes were posted to the project and days when notes were not posted to the project, the method further comprising:
   providing notification to an originator who did not post required information to the project;
   escalating the notification to a project manager when the originator is unresponsive to the notification;
   providing management with an informational view of the calendar wherein the management can determine the originator's reporting compliance; and
   providing management reports with analysis of user compliance.

4. The method of claim 1, wherein the user's client device is location aware, the method further comprising receiving location information from the client device and correlating keywords or tags in the project notes with the location information to generate a location based event and issue histogram for the project.

5. The method of claim 1, further comprising generating a project completion punch-list of uncompleted items and associated tasks assigned to a user identified as a project resource,
   wherein items in the punch-list are derived from a master list comprising a list of all items and tasks associated with project resources in a required order of completion, wherein after a successor task is completed by the user and reported to the information database, a successor task is assigned to the project resource associated with the successor task.

6. The method of claim 1, wherein the predefined access rights comprise administration, full access, partial access, guest access and no access.

7. The method of claim 1, further comprising:
printing a time sheet preconfigured with information identifying an employee and the projects the employee is assigned to;
receiving an image of the of the time sheet that includes hours and work codes entered by the employee;
processing the image with optical character recognition (OCR) software to extract payroll data comprising the identifying information, the hours and the work codes; and
posting the payroll data to a payroll system for review.

8. A system for generating and managing a secure, multi-user information database, comprising:
a receiving system configured to receive, utilizing a voice recorder, project information from an originator via at least one of a wireless-based infrastructure and public telephone network infrastructure,
a web log system, comprising a web log media processor, a speech automation and translation module configured for language normalization and transcription of the received project information, a relational database and a storage component, configured to: (i) parse the transcribed project information so as to extract a key phrase therefrom, (ii) associate the entire transcribed project information to a single one of predetermined information categories, selected based at least in part on the extracted key phrase, (iii) record the transcribed project information, and (iv) to provide an audio confirmation to the originator comprising a confirmation code configured as a record locator for the project information;
a data services and integration module comprising a data import/export module and a report generation module; and
a user interface and account management module comprising an originator interface, a configuration and billing interface, a transcriber interface, a report interface and an alert and notification service.

9. The system of claim 8, wherein the speech automation and translation module is configured to provide a transcription of the project information in a specified language and to parse the project information into predetermined categories.

10. The system of claim 9, wherein the transcriber interface is configured to provide the transcription for review, and wherein the transcription is accepted or corrected.

11. The system of claim 10, wherein the originator interface is configured to provide the transcription to the originator wherein the transcription is either accepted or corrected, and either approved for inclusion in project reports or disapproved.

12. The system of claim 11, wherein the report generation module and report interface are configured to post the transcription to a common access site wherein project notes are available for review by users with predefined access rights.

13. The system of claim 8, wherein the user interface and account management module is configured to poll originators and transcribers for compatibility metrics and to align originators with transcribers for future transcriptions based on an analysis of the compatibility metrics.

14. The system of claim 8, wherein the alert and notification service is configured to provide notification to an originator who does not post required information to the project and to escalate the notification to a project manager when the originator is unresponsive to the notification.

15. The system of claim 8, wherein the project information includes location data and wherein the report generation module is configured to correlate keywords or tags in the project information with the location data to generate a location based event and issue histogram for the project.

16. The system of claim 8, wherein the user interface module is configured to provide a project completion punch-list of uncompleted items assigned to a user identified as a project resource,
wherein items in the punch-list are derived from a master list comprising a list of all items associated with project resources in a required order of completion,
wherein after a punch-list item is completed by the user and reported to the information database, a next uncompleted item in the required order of completion is assigned to the project resource associated with the next uncompleted item in the master list.

17. An article of manufacturer, comprising a machine-readable medium including instructions thereon which, when read by a machine, cause the machine to perform operations, comprising:
receiving and recording, utilizing a voice recorder, information related to a project from an originator's client device, wherein the information comprises of a voice-note and a data attachment,
providing an audio confirmation to the originator, comprising a confirmation code configured to provide a record locator for the information;
transcribing the information to a transcription, the step of transcribing comprising language normalization;
parsing the transcription to be posted to extract a key phrase therefrom, and associating the entire transcription to a single one of predetermined information categories, selected based at least in part on the extracted key phrase;
reviewing the transcription at a second level of language normalization and information parsing to predetermined information categories, wherein the transcription is accepted or corrected,
submitting the transcription to the originator, wherein the transcription is either accepted or corrected, and either approved for inclusion in project reports or disapproved;
posting the transcription and data attachments as project notes to a common access site wherein the project notes are available for review by users with predefined access rights.

18. The article of manufacture of claim 17, wherein the operations further comprise:
polling originators and transcribers for compatibility metrics; and
analyzing the compatibility metrics to align originators with transcribers for future transcriptions.

19. The article of manufacture of claim 17, wherein the common access site includes a project calendar, specific to an originator or a project, indicating days when notes were posted to the project and days when notes were not posted to the project, the operations further comprising:
providing notification to an originator who did not post information as required to the project;
escalating the notification to a project manager when the originator is unresponsive to the notification; and
providing management with an informational view of the calendar wherein the management can determine the originator's reporting compliance.

20. The article of manufacture of claim 17, wherein the user's client device is location aware, the operations further comprising receiving location information from the client device and correlating keywords or tags in the project notes with the location information to generate a location based event and issue histogram for the project.

21. The article of manufacture of claim 17, the operations further comprising providing a project completion punch-list of uncompleted items to a use identified as a project resource,
   wherein items in the punch-list are derived from a master list comprising a list of all items associated with project resources in a required order of completion,
   wherein after a punch-list item is completed by the user and reported to the information database, a next uncompleted item in the required order of completion is assigned to the project resource associated with the next uncompleted item in the master list.

\* \* \* \* \*